United States Patent
Suzuki et al.

(10) Patent No.: US 9,088,234 B2
(45) Date of Patent: Jul. 21, 2015

(54) MOTOR-DRIVING SYSTEM

(71) Applicant: KABUSHIKI KAISHA TOYOTA CHUO KENKYUSHO, Nagakute-shi, Aichi-ken (JP)

(72) Inventors: Hiromitsu Suzuki, Nagoya (JP); Hiroki Ohtani, Nagakute (JP); Hideo Nakai, Nisshin (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 203 days.

(21) Appl. No.: 13/755,805

(22) Filed: Jan. 31, 2013

(65) Prior Publication Data

US 2013/0200830 A1 Aug. 8, 2013

(30) Foreign Application Priority Data

Feb. 7, 2012 (JP) ................................. 2012-023580

(51) Int. Cl.
*H02P 6/14* (2006.01)
*H02P 27/08* (2006.01)
*H02M 1/12* (2006.01)
*H02M 7/5395* (2006.01)

(52) U.S. Cl.
CPC . *H02P 6/14* (2013.01); *H02M 1/12* (2013.01); *H02M 7/5395* (2013.01); *H02P 27/085* (2013.01)

(58) Field of Classification Search
CPC ... H02K 29/03; H02M 7/5395; H02P 27/085; H02P 6/14; H03L 5/00
USPC .................. 318/400.02, 400.26, 400.27, 722; 318/254.1, 599, 603
See application file for complete search history.

(56) References Cited

U.S. PATENT DOCUMENTS

| | | | | |
|---|---|---|---|---|
| 4,456,865 A * | 6/1984 | Robertson et al. | ............ | 318/599 |
| 5,241,129 A * | 8/1993 | Muto et al. | ........................ | 84/625 |
| 5,463,299 A * | 10/1995 | Futami et al. | ................. | 318/618 |
| 6,654,548 B2 | 11/2003 | Schmitz | ........................ | 388/825 |
| 7,327,111 B2 * | 2/2008 | Rastogi et al. | ................. | 318/432 |
| 8,344,680 B2 * | 1/2013 | Kitanaka | ........................ | 318/632 |
| 2006/0006825 A1* | 1/2006 | Inaguma et al. | .............. | 318/432 |
| 2010/0127656 A1* | 5/2010 | Ohtani et al. | .................. | 318/811 |
| 2011/0025240 A1* | 2/2011 | Furukawa et al. | ......... | 318/400.3 |
| 2011/0266992 A1* | 11/2011 | Nishiguchi et al. | ........... | 318/807 |

FOREIGN PATENT DOCUMENTS

| | | | | |
|---|---|---|---|---|
| JP | 08331856 A | * | 12/1996 | .............. H02M 7/48 |
| JP | A-8-331856 | | 12/1996 | |

(Continued)

OTHER PUBLICATIONS

Feb. 4, 2014 Office Action issued in Japanese Patent Application No. 2012-023580 (with translation).

*Primary Examiner* — Bentsu Ro
*Assistant Examiner* — Thai Dinh
(74) *Attorney, Agent, or Firm* — Oliff PLC (57) ABSTRACT

The invention includes a three-phase full-bridge power converter, a motor generator driven by the power converter, a pulse number generator which determines the number of pulses included in the driving signal for one electrical cycle, a voltage command generator which determines a modulation factor and a phase angle of driving voltage, and a pulse generator which generates the driving signal, and, in this invention, the pulse generator generates the driving signal having a pulse waveform which minimizes power loss in the power generator and the motor generator according to the number of pulses, the modulation factor, and the phase angle.

15 Claims, 6 Drawing Sheets

(56) References Cited

FOREIGN PATENT DOCUMENTS

| JP | 2008072832 A | * | 3/2008 |
| JP | A-2008-72802 | | 3/2008 |
| JP | A-2008-72832 | | 3/2008 |
| JP | A-2011-35991 | | 2/2011 |

* cited by examiner

OUTPUT RESULTS (CURRENT WAVEFORMS)

FIG. 4

OUTPUT RESULTS (CURRENT WAVEFORMS)

MOTOR-DRIVING SYSTEM

PRIORITY INFORMATION

This application claims priority to Japanese Patent Application No. 2012-023580 filed on Feb. 7, 2012, which is incorporated herein by reference in its entirety.

BACKGROUND OF THE INVENTION

1. Field of the Invention

The present invention relates to a motor-driving system using a pulse width modulation signal having an optimized pulse waveform.

2. Description of the Related Art

In recent years, with the aim of realizing safer, more secure, and more comfortable cars, cars powered by a motor generator, such as hybrid cars or electric cars, have increased in number.

In such a car, torque is generated by driving a motor generator using power from a battery to obtain the driving force of the car. At this time, a power converter is used to convert DC power from the battery to AC power. The power converter receives DC power from the battery and converts this DC power to three-phase AC power. Here, it is desirable to reduce power loss in the power converter and the motor generator as much as possible, to thereby allow more effective utilization of the power from the battery.

In response to this situation, there are disclosed techniques for reducing power loss due to heat generation by switching a switching element included in a power converter. For example, there is disclosed a method for eliminating, in a three-phase full-bridge power converter, components which are equal to or greater than the fifth order harmonic components of a rectangular wave from a particular phase thereof. Further, there is also disclosed a technique in which, if switching is performed M times during a half-cycle, a waveform is set to have half-wave symmetry and odd symmetry, thereby reducing harmonic components.

A low-order harmonic cancellation PWM which only considers reducing low-order harmonic components of power input by switching a power converter was disclosed, and does not consider current distortion and effects on torque that are caused when driving voltage is applied to a motor generator. Therefore, for example, iron loss of the motor generator which is caused by harmonic components of current is also not taken into consideration, and thus control is not carried out in consideration of loss of the entire driving system including a power converter and a motor generator.

SUMMARY OF THE INVENTION

An aspect of the present invention is a motor-driving system having a three-phase full-bridge power converter having an upper arm and a lower arm, each including a switching element; a motor generator driven by applying driving voltage from the power converter; and a control unit which outputs a driving signal to the switching element included in the power converter. In this system, the control unit has a pulse generator which generates, as the driving signal, a predetermined number of pulses and a predetermined pulse waveform having a predetermined amplitude and a predetermined phase angle of a fundamental wave of voltage applied to the motor generator; the predetermined pulse waveform is a pulse waveform in which an evaluation value is minimum; and the evaluation value is power loss, current distortion, or torque ripple of the motor generator.

DESCRIPTION OF THE PREFERRED EMBODIMENTS

Figure 1:
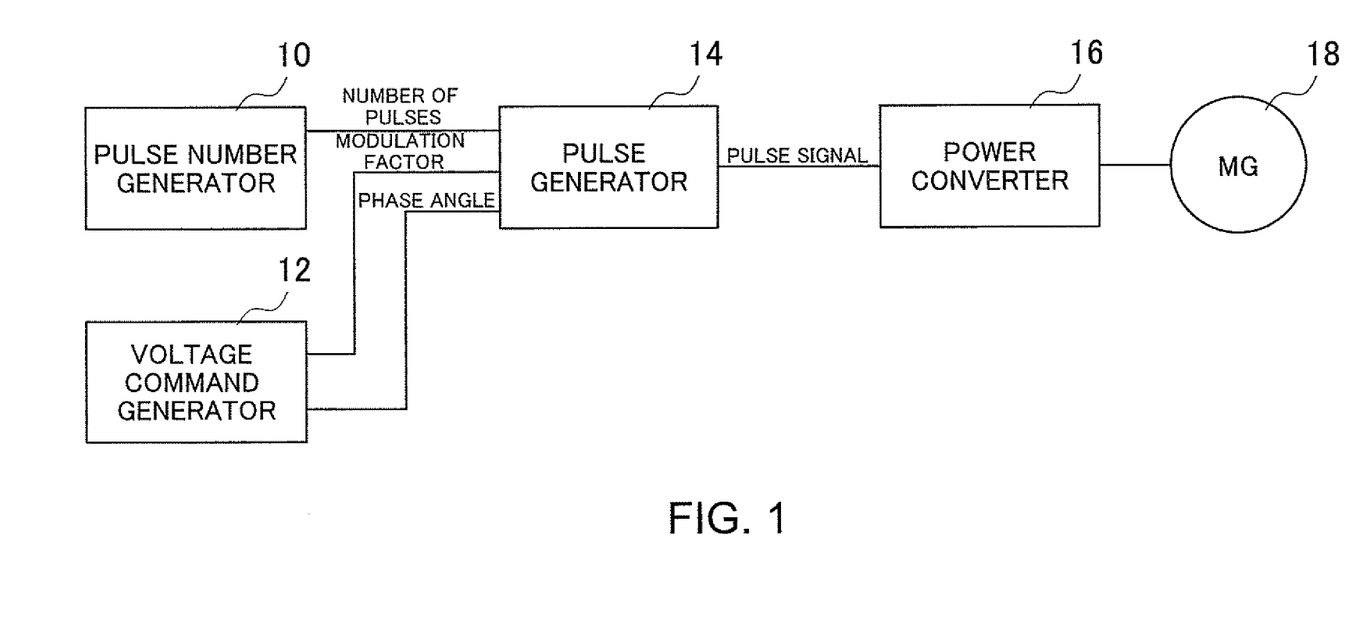
FIG. 1 shows a configuration of a motor-driving system in an embodiment of the present invention.

As shown in FIG. 1, a motor-driving system 100 in an embodiment of the present invention is configured to have a pulse number generator 10, a voltage command generator 12, a pulse generator 14, a power converter 16, and a motor generator 18.

The pulse number generator 10 determines the number of pulses per cycle of electrical angle according to input parameters such as a torque command value T* and the number of revolutions N of the motor generator 18, and outputs the result.

The voltage command generator 12 determines a voltage modulation factor and a phase angle according to the input parameters and outputs the result. The voltage command generator 12 receives the torque command value T*, computes a voltage modulation factor and a phase angle according to the torque command value T*, and outputs the results. If the motor-driving system 100 is applied to a vehicle-driving system, an electronic control unit (ECU, not shown) generates a torque command value T* according to an accelerator position and a brake pedal pressing angle. The voltage modulation factor and the phase angle are used to determine amplitude and phase of a fundamental wave of voltage which is applied to the motor generator 18.

Specifically, the voltage command generator 12 can use torque deviation $\Delta T$ together with voltage Vdc of a DC power supply connected to the power converter 16 and an angular velocity $\omega$ of the motor generator 18, and substitute them into a predetermined computing equation (or performs equivalent processing), thereby determining a necessary modulation factor and phase angle.

The voltage command generator 12 can also calculate the voltage modulation factor and the phase angle using, as the input parameters, a d axis voltage command value vd* and a q axis voltage command value vq* output from a current command converter (not shown). The current command converter receives the torque command value T* and the number of revolutions N (angular velocity $\omega$) of the motor generator 18, and calculates a d axis current command value id* and a q axis current command value iq* from these values. Further, a current sensor (not shown) detects a current value of a AC current output from the power converter 16, performs three-phase/d-q axis conversion on those detected values to convert them to a d axis current value id and a q axis current value iq, and determines a d axis voltage command value vd* and a q axis voltage command value vq* so that the d axis current value id and the q axis current value iq become closer to the d axis current command value id* and the q axis current command value iq*, respectively, and outputs the results. The voltage command generator 12 calculates a phase angle of the voltage from a vector angle formed by the d axis voltage command value vd* and the q axis voltage command value vq*. The voltage command generator 12 also calculates a voltage modulation factor from a ratio between an absolute value of a voltage command value composed of the d axis voltage command value vd* and the q axis voltage command value vq* and a voltage value of DC voltage applied to the power converter 16.

The pulse generator 14 receives the number of pulses output from the pulse number generator 10 and the voltage modulation factor and the phase angle output from the voltage command generator 12, and generates pulse signals to be applied to the power converter 16 based on these values and outputs the results. Specific processing in the pulse generator 14 will be described later.

The power converter 16 is configured to include an inverter circuit. The inverter circuit may be a three-phase full-bridge circuit having an upper arm and a lower arm, each including a switching element which is controlled to be opened and closed by a pulse signal output from the pulse generator 14. The power converter 16 may further have a voltage converter for stepping up and stepping down DC voltage from a battery, etc. The power converter 16 receives pulse signals from the pulse generator 14, controls opening and closing of the switching elements of the inverter circuit using the pulse signals, and generates three-phase quasi-sinusoidal voltage. The quasi-sinusoidal voltage is applied to the motor generator 18.

The motor generator 18 is configured to include a permanent magnet synchronization (PM) motor. The motor generator 18 receives the three-phase quasi-sinusoidal voltage from the power converter 16 and causes a rotor to rotate. A running torque generated by the motor generator 18 is used as driving force for a car, etc.

The motor generator 18 may also be equipped with a resolver (not shown) for detecting a rotational displacement (rotation angle) θ of the rotor. The resolver detects a rotational displacement (rotation angle) θ of the rotor of the motor generator 18. An output from the resolver is input to an angular velocity computing unit, and the angular velocity computing unit converts the rotational displacement (rotation angle) θ into the angular velocity ω of the rotor of the motor generator 18, and outputs the result. The angular velocity ω is input to the pulse number generator 10, etc. when necessary.

Further, there may also be employed a configuration whereby current sensors (not shown) are installed on a power line extending from the power converter 16 to the motor generator 18, current values iu, iv, and iw of the respective phases are detected in real time using those current sensors, and the current values iu, iv, and iw are converted into a d axis current value id and a q axis current value iq in the three-phase/d-q axis converter (not shown). The d axis current value id and the q axis current value iq are input to the pulse number generator 10, etc. when necessary.

The process performed in the pulse generator 14 will next be described. In the present embodiment, the pulse generator 14 generates a pulse signal using an improved power loss reduction PWM control method, thereby controlling the power converter 16. In the power loss reduction PWM control, the pulse generator 14 calculates, in advance, a pulse waveform from which low harmonics included in a rectangular wave pulse are removed; causes a memory device to store, as waveform maps, pulse waveforms which are optimal for the number of pulses for one electrical cycle, the voltage modulation factor, and the phase angle, respectively; selects pulse waveforms according to the number of pulses, the voltage modulation factor, and the phase angle; and outputs the results.

Here, by causing the pulse waveform to have half wave symmetry (f(ωt)=−f(ωt+π)), it is possible to cancel even order harmonics, and further, by causing the pulse waveform to have odd symmetry (f(ωt)=f(π−ωt)), it is possible to cancel cosine components of the harmonics.

Figure 2:
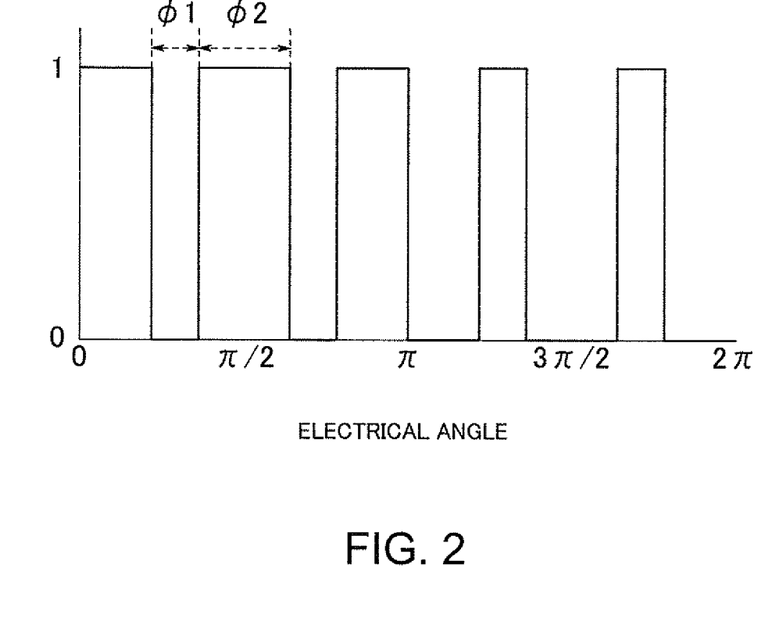
FIG. 2 shows an example of a pulse waveform in the embodiment of the present invention.

For example, in the case of a pulse waveform having five pulses for one electrical cycle, it is possible to provide it as a pulse waveform that satisfies the half-wave symmetry and the odd symmetry shown in FIG. 2. Here, if pulse widths $\phi_1$ and $\phi_2$ are defined as shown in FIG. 2, fundamental wave amplitude K of the pulse waveform is expressed as Equation (1).

[Equation 1]

$$K = \frac{2}{\pi}\left\{1 - 2\sin\left(\frac{2\phi_1 + \phi_2}{2}\right) + 2\sin\left(\frac{\phi_2}{2}\right)\right\} \quad (1)$$

It is possible to express pulse width $\phi_1$ as in Equation (2) by modifying Equation (1).

[Equation 2]

$$\phi_1 = \frac{2\sin^{-1}\left\{\sin\left(\frac{\phi_2}{2}\right) - \frac{\pi K}{4} + \frac{1}{2}\right\} - \phi_2}{2} \quad (2)$$

In other words, once pulse width $\phi_2$ and fundamental wave amplitude K are determined, pulse width $\phi_1$ can be determined.

Figure 3:
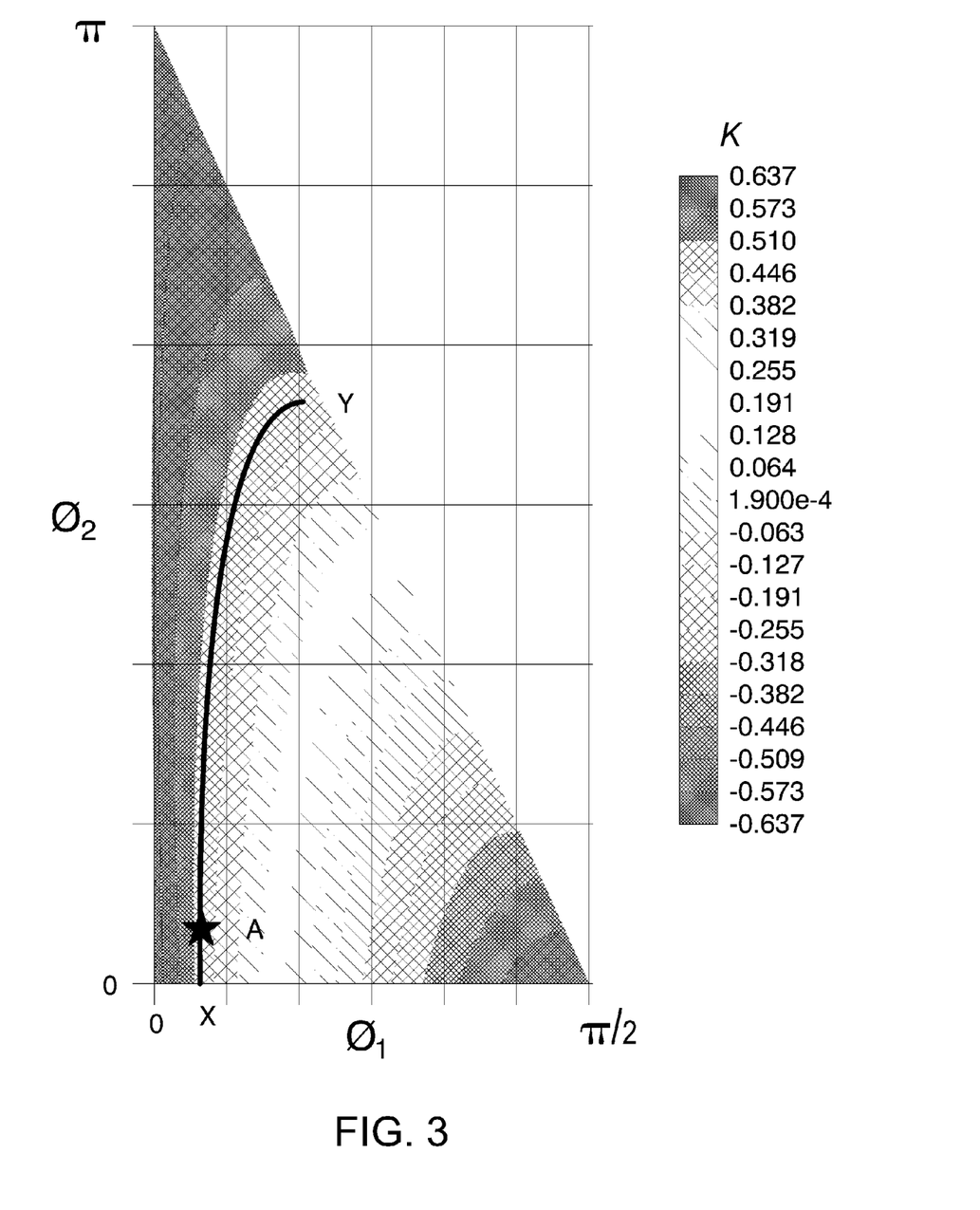
FIG. 3 shows an example of a contour map in the embodiment of the present invention.

FIG. 3 shows a contour map of the fundamental wave amplitude K, with the lateral axis indicating pulse width $\phi_1$ and the vertical axis indicating pulse width $\phi_2$. In FIG. 3, combinations of pulse widths $\phi_1$ and pulse widths $\phi_2$ having the same fundamental wave amplitude K are expressed in the same tone. The pulse generator 14 selects a pulse waveform which is optimal for driving the motor generator and obtained by searching the fundamental wave amplitude defined, for example, according to the number of input pulses, the voltage modulation factor, and the phase angle. The pulse generator 14 outputs the optimal pulse waveform to the power converter 16.

For example, if the modulation factor is 0.5, a pulse waveform having any combination of pulse width $\phi_1$ and pulse width $\phi_2$, which is on the fundamental wave amplitude and connects points X and Y in FIG. 3, is an optimal waveform for driving the motor generator 18.

In the present embodiment, a combination of pulse width $\phi_1$ and pulse width $\phi_2$ by which power loss in the motor generator 18 is minimized is determined for each value of the fundamental wave amplitude using, for example, electromagnetic field analysis.

That is, a motor generator model is set in advance in consideration of characteristics of the motor generator 18 using electromagnetic field analysis. Pulse waveforms defined by combinations of pulse width $\phi_1$ and pulse width $\phi_2$, which have been provided for respective values of the fundamental wave amplitude and obtained from the contour map, are introduced into this motor generator model, to thereby calculate changes in current and torque waveforms. Further, power loss in the motor generator is calculated from the changes of current and torque, to thereby select a combination of pulse width $\phi_1$ and pulse width $\phi_2$ in which power loss becomes small.

Figure 4:
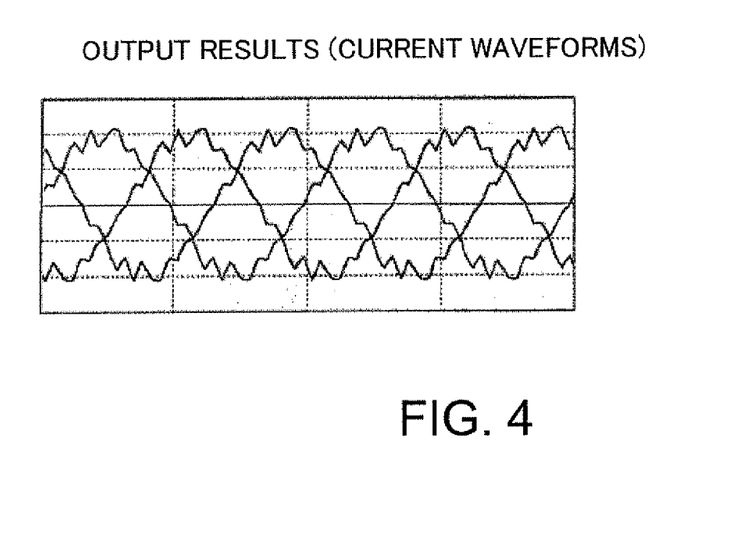
FIG. 4 shows an example of current waveforms calculated by applying a pulse waveform.
Figure 5:
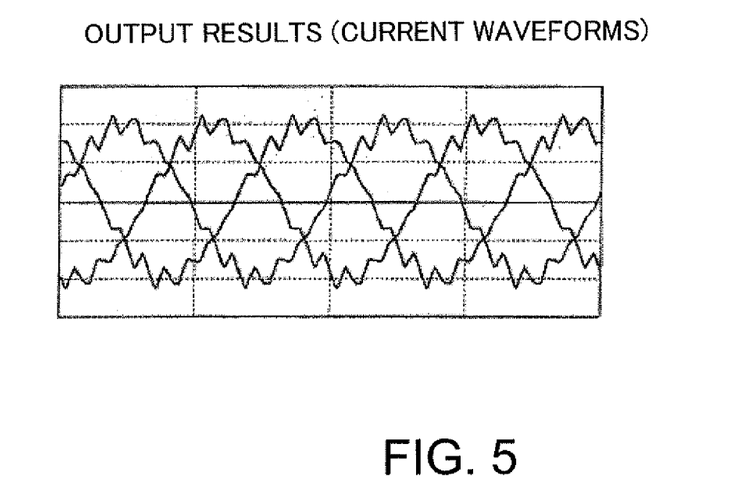
FIG. 5 shows an example of current waveforms calculated by applying a pulse waveform.

For example, if the modulation factor is 0.5, a low-order harmonic cancellation PWM according to the conventional method has a pulse waveform with a pulse width $\phi_1$ of 10.46 degrees and a pulse width $\phi_2$ of 11.60 degrees. If such a pulse waveform is introduced into the motor generator model, the current waveforms of the U phase, V phase, and W phase shown in FIG. 4 are obtained. Meanwhile, if a pulse waveform defined by a combination of a pulse width $\phi_1$ of 10.54 degrees and a pulse width $\phi_2$ of 17.93 degrees is introduced into the motor generator model, the current waveforms of the U phase, V phase, and W phase shown in FIG. 5 are obtained.

Figure 6:
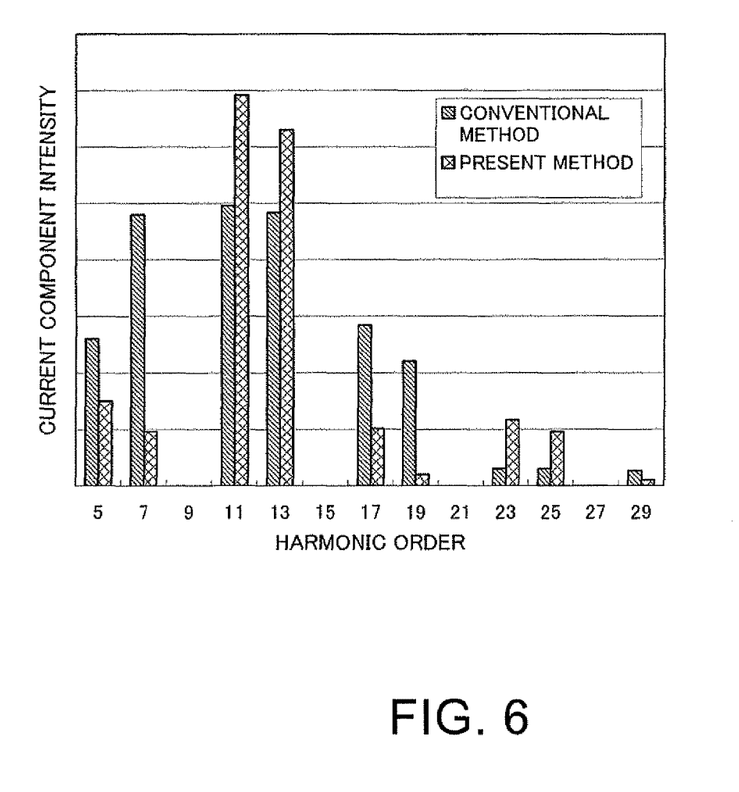
FIG. 6 shows changes of power distortion in harmonic components.

When the current waveforms obtained in such a manner are subjected to fast Fourier transform (FFT) processing, the harmonic components as shown in FIG. 6 are obtained. In FIG. 6, compared to the conventional method, the 11th and 13th components increase, while the 5th and 7th components decrease. The lower harmonic components have great influence on loss in the motor generator 18. In consideration of such influence of the harmonic components on power loss, a combination of pulse width $\phi_1$ and pulse width $\phi_2$ which can reduce power loss is selected.

Figure 7:
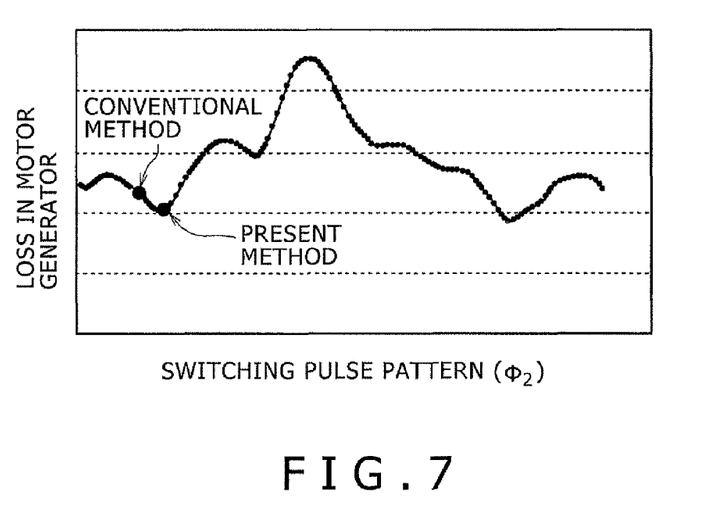
FIG. 7 shows an example of change of power loss calculated with respect to pulse width.

FIG. 7 shows power loss in the motor generator over pulse width $\phi_2$ when a modulation factor is 0.5. FIG. 7 shows power loss in the low-order harmonic cancellation PWM according to the conventional method (shown as CONVENTIONAL METHOD in the figure), and power loss in the power loss reduction PWM according to the present method (shown as PRESENT METHOD in the figure). As shown in this figure, a combination of pulse width $\phi_1$ and pulse width $\phi_2$ in which power loss in the motor generator becomes small is selected, and a pulse waveform defined by the combination is determined as an optimal waveform for the fundamental wave amplitude K. More specifically, it is preferable to select a pulse waveform that is defined by a combination of pulse width $\phi_1$ and pulse width $\phi_2$ in which the power loss in the motor generator becomes a minimum value. Such processing is carried out for each fundamental wave amplitude K, to thereby set a pulse waveform defined by a combination of pulse width $\phi_1$ and pulse width $\phi_2$ which is optimal for each fundamental wave amplitude K. The pulse waveform is registered as a waveform map in association with the number of pulses for one electrical cycle, the voltage modulation factor, and the phase angle.

That is, in the present method, by adopting the power loss reduction PWM control method, power loss due to switching in the power converter 16 is reduced. At the same time, by selecting a combination of pulse width $\phi_1$ and pulse width $\phi_2$, in which power loss in the motor generator becomes minimum, it is possible to reduce loss of the entire motor-driving system as compared with the conventional combination of pulse width $\phi_1$ and pulse width $\phi_2$.

Although, in the present embodiment, the pulse waveform has been determined on the basis of power loss in the motor-driving system, the pulse waveform may be determined on the basis of power distortion in the motor-driving system. A combination of pulse width $\phi_1$ and pulse width $\phi_2$ for which the power distortion in the motor-driving system becomes small is selected, and a pulse waveform defined by that combination is determined as a pulse waveform of the fundamental wave amplitude K. More specifically, it is preferable to select a pulse waveform that is defined by a combination of pulse width $\phi_1$ and pulse width $\phi_2$ for which the current distortion becomes a minimum value.

Further, the pulse waveform may be determined based on changes of torque. More specifically, a pulse waveform may be determined by calculating changes of torque using the motor generator model for each fundamental wave amplitude K, selecting a combination of pulse width $\phi_1$ and pulse width $\phi_2$ in which torque ripple becomes small, and determining a pulse waveform defined by that combination as a pulse waveform of a certain fundamental wave amplitude K. Specifically, it is preferable to select a pulse waveform that is defined by a combination of pulse width $\phi_1$ and pulse width $\phi_2$ in which the torque ripple becomes a minimum value.

Further, although, in the present embodiment, the pulse waveform which has five pulses for one electric cycle has been described, pulse waveforms with numbers of pulses other than five pulses may also be processed in a similar manner.

As such, according to the present embodiment, because the number of switching times of the switching element can be reduced, it is possible to remove harmonic components more effectively than can the low-order harmonics cancellation PWM control method, which is excellent in terms of low loss, and reduce loss of the entire system including the motor generator.

What is claimed is:

1. A motor-driving system comprising:
   a three-phase full-bridge power converter having an upper arm and a lower arm, each including a switching element;
   a motor generator driven by applying driving voltage from the power converter; and
   a control unit which outputs a driving signal to the switching element included in the power converter, the control unit having:
      a pulse generator which generates, as the driving signal, a predetermined number of pulses and a predetermined pulse waveform having a predetermined amplitude and a predetermined phase angle of a fundamental wave of voltage applied to the motor generator; and
      a memory device storing waveform maps of pulse waveforms that are selected based on a motor generator model,
   wherein the predetermined pulse waveform is a pulse waveform in which an evaluation value is minimum; and
   the evaluation value is power loss, current distortion, or torque ripple of the motor generator.

2. The motor-driving system according to claim 1, wherein the evaluation value is power loss, current distortion, or torque ripple calculated by electromagnetic field analysis based on the motor generator model which is predetermined in association with characteristics of the motor generator.

3. The motor-driving system according to claim 2, wherein the predetermined pulse waveform is half-wave symmetric ($f(\omega t)=-f(\omega t+n)$) and odd symmetric ($f(\omega t)=f(\pi-\omega t)$).

4. The motor-driving system according to claim 3, wherein:
   the predetermined pulse waveform has a plurality of pulse widths corresponding to the predetermined number of pulses; and
   the predetermined pulse waveform is a pulse waveform having the pulse width in which the evaluation value is minimum, among a plurality of pulse waveforms having the predetermined number of pulses, the predetermined amplitude, the predetermined phase angle, and different pulse widths.

5. The motor-driving system according to claim 1, wherein the predetermined pulse waveform is half-wave symmetric ($f(\omega t)=-f(\omega t+n)$) and odd symmetric ($f(\omega t)=f(\pi-\omega t)$).

6. The motor-driving system according to claim 5, wherein:
the predetermined pulse waveform has a plurality of pulse widths corresponding to the predetermined number of pulses; and
the predetermined pulse waveform is a pulse waveform having the pulse width in which the evaluation value is minimum, among a plurality of pulse waveforms having the predetermined number of pulses, the predetermined amplitude, the predetermined phase angle, and different pulse widths.

7. The motor-driving system according to claim 5, wherein:
the predetermined number of pulses is five;
the predetermined pulse waveform has a first pulse width $\phi 1$ and a second pulse width $\phi 2$; and
the predetermined pulse waveform is a pulse waveform having the first pulse width and the second pulse width in which the evaluation value is minimum, among a plurality of pulse waveforms having the predetermined number of pulses, the predetermined amplitude, the predetermined phase angle, and different first pulse widths or second pulse widths.

8. A motor-driving system comprising:
a three-phase full-bridge power converter having an upper arm and a lower arm, each including a switching element;
a motor generator driven by applying driving voltage from the power converter; and
a control unit which outputs a driving signal to the switching element included in the power converter, the control unit having a pulse generator which generates, as the driving signal, a predetermined number of pulses and a predetermined pulse waveform having a predetermined amplitude and a predetermined phase angle of a fundamental wave of voltage applied to the motor generator,
wherein the predetermined pulse waveform is a pulse waveform having a pulse width selected based on a motor generator model which is predetermined in association with characteristics of the motor generator, among a plurality of different pulse waveforms having the predetermined number of pulses, the predetermined amplitude, and the predetermined phase angle, and different pulse widths.

9. The motor-driving system according to claim 8, wherein:
the predetermined pulse waveform is half-wave symmetric ($f(\omega t)=-f(\omega t+\pi)$) and odd symmetric ($f(\omega t)=f(\pi-\omega t)$);
the predetermined pulse waveform has a plurality of pulse widths corresponding to the predetermined number of pulses.

10. A motor-driving system comprising:
a three-phase full-bridge power converter having an upper arm and a lower arm, each including a switching element;
a motor generator driven by applying driving voltage from the power converter; and
a control unit which outputs a driving signal to the switching element included in the power converter, the control unit having a pulse generator which generates, as the driving signal, a predetermined number of pulses and a predetermined pulse waveform having a predetermined amplitude and a predetermined phase angle of a fundamental wave of voltage applied to the motor generator,
wherein an evaluation value obtained in the predetermined pulse waveform is smaller than an evaluation value obtained in a pulse waveform of a low-order harmonic cancellation PWM, and the evaluation value is power loss, current distortion, or torque ripple of the motor generator.

11. The motor-driving system according to claim 10, wherein the evaluation value is power loss, current distortion, or torque ripple calculated by electromagnetic field analysis based on a motor generator model which is predetermined in association with characteristics of the motor generator.

12. The motor-driving system according to claim 11, wherein the predetermined pulse waveform is half-wave symmetric ($f(\omega t)=-f(\omega t+\pi)$) and odd symmetric ($f(\omega t)=f(\pi-\omega t)$).

13. The motor-driving system according to claim 10, wherein the predetermined pulse waveform is half-wave symmetric ($f(\omega t)=-f(\omega t+\pi)$) and odd symmetric ($f(\omega t)=f(\pi-\omega t)$).

14. The motor-driving system according to claim 13, wherein:
the predetermined pulse waveform has a plurality of pulse widths corresponding to the predetermined number of pulses; and
the predetermined pulse waveform is a pulse waveform having the pulse width which provides an evaluation value smaller than an evaluation value obtained in a pulse waveform of a low-order harmonic cancellation PWM, among a plurality of pulse waveforms having the predetermined number of pulses, the predetermined amplitude, the predetermined phase angle, and different pulse widths.

15. The motor-driving system according to claim 14, wherein:
the predetermined number of pulses is five;
the predetermined pulse waveform has a first pulse width $\phi 1$ and a second pulse width $\phi 2$; and
the predetermined pulse waveform is a pulse waveform having a first pulse width and a second pulse width which provide an evaluation value smaller than the evaluation value obtained in the pulse waveform of the low-order harmonic cancellation PWM, among the plurality of pulse waveforms having the predetermined number of pulses, the predetermined amplitude, the predetermined phase angle, and the different pulse widths.

* * * * *